US006457867B1

(12) United States Patent
Rogers

(10) Patent No.: US 6,457,867 B1
(45) Date of Patent: Oct. 1, 2002

(54) METHOD AND APPARATUS FOR REPLENISHING OIL IN A FLUID DYNAMIC BEARING USING A SLEEVE GROOVE

(75) Inventor: David John Rogers, Jamul, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/625,809

(22) Filed: Jul. 26, 2000

(51) Int. Cl.[7] .............................................. F16C 32/06
(52) U.S. Cl. ....................... 384/113; 384/114; 384/291; 384/397
(58) Field of Search ................... 384/100, 107, 384/113, 114, 115, 118, 322, 389, 397 291

(56) References Cited

U.S. PATENT DOCUMENTS

| 3,517,973 A | * | 6/1970 | Hirs | 384/115 |
|---|---|---|---|---|
| 3,669,517 A | * | 6/1972 | Hughes | 384/115 |
| 4,726,693 A | * | 2/1988 | Anderson et al. | 384/114 |
| 4,892,418 A | | 1/1990 | Asada et al. | |
| 5,089,732 A | | 2/1992 | Konno et al. | |
| 5,427,456 A | | 6/1995 | Hensel | |
| 5,516,212 A | | 5/1996 | Titcomb | |
| 5,932,946 A | * | 8/1999 | Miyasaka et al. | 384/100 |
| 6,196,722 B1 | * | 3/2001 | Asada et al. | 384/107 |

FOREIGN PATENT DOCUMENTS

| JP | 61-9138 | * | 1/1986 |
|---|---|---|---|
| JP | 2-176213 | * | 7/1990 |
| JP | 5-215128 | * | 8/1993 |

* cited by examiner

Primary Examiner—William C Joyce
(74) Attorney, Agent, or Firm—Altera Law Group, LLC

(57) ABSTRACT

A method and apparatus for replenishing oil in a fluid dynamic bearing using a sleeve groove. The replenishing groove is formed in the sleeve surrounding the shaft so that centrifugal force drives the oil to move toward the radial bearings.

15 Claims, 4 Drawing Sheets

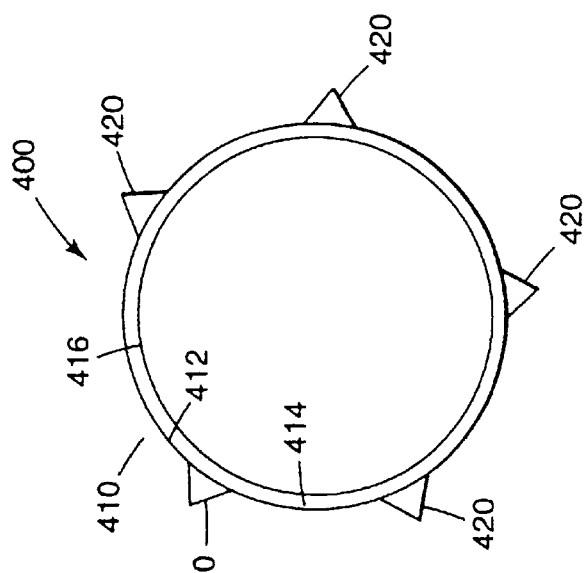
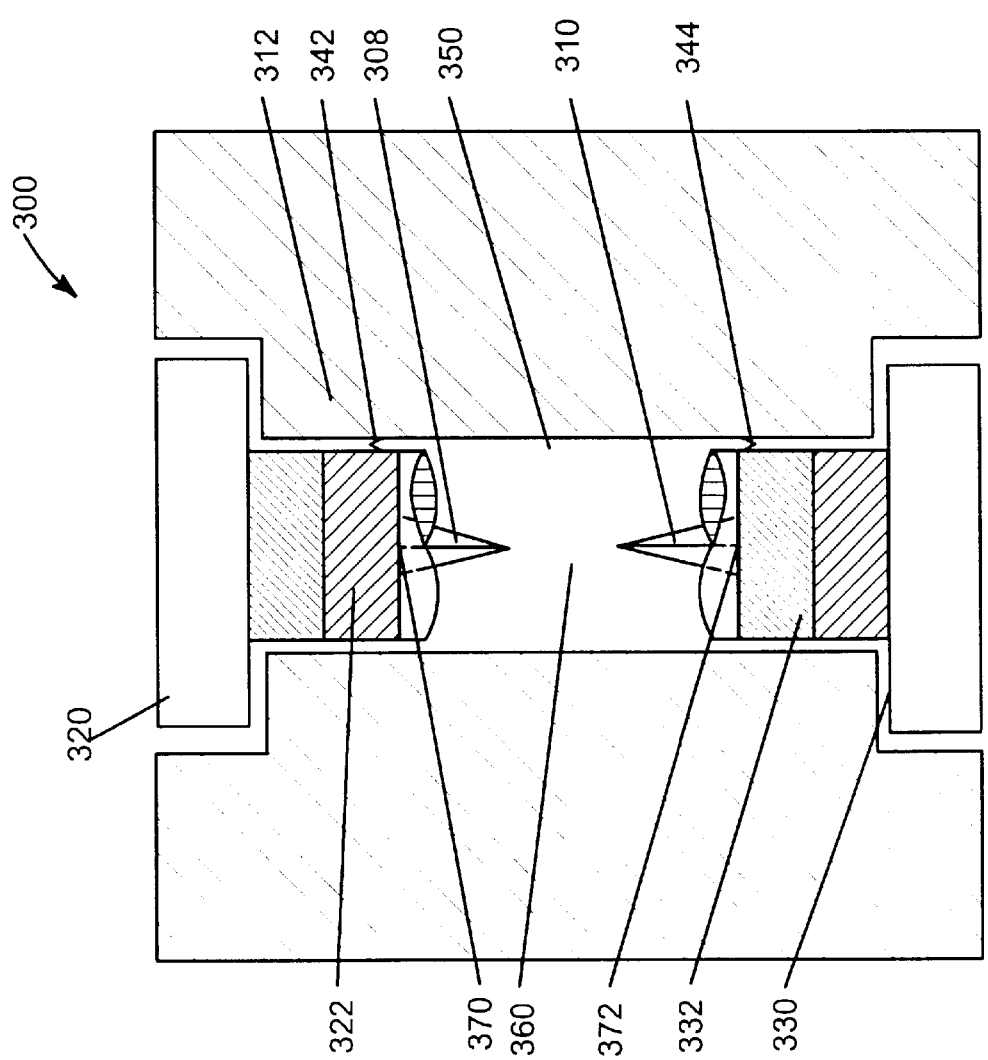

METHOD AND APPARATUS FOR REPLENISHING OIL IN A FLUID DYNAMIC BEARING USING A SLEEVE GROOVE

BACKGROUND OF THE INVENTION

1. Field of the Invention.

This invention relates in general to spindle motors for use in magnetic disk storage systems, and more particularly to a method and apparatus for replenishing oil in a fluid dynamic bearing using a sleeve groove.

2. Description of Related Art.

The storage capacity and general performance of hard disk drives have improved steadily over the last decade in response to the increasing demands of the computer industry. These developments have been mainly fueled by corresponding advances in the components of magnetic recording technology and in electronic sophistication and miniaturization. In particular, magnetic read/write recording heads and disks are capable of supporting a real data storage densities typically ten times greater than they could ten years ago. This is being achieved by higher track densities, higher linear flux transition densities and lower recording head flying heights.

Data storage systems, such as disk drives, commonly make use of rotating storage disks. The storage disks are commonly magnetic disks but could also be optical. In a typical magnetic disk drive, a magnetic disk rotates at high speed and a transducing head uses air pressure to "fly" over the top surface of the disk. The transducing head records information on the disk surface by impressing a magnetic field on the disk. Information is read back using the head by detecting magnetization of the disk surface. The magnetic disk surface is divided in a plurality of concentric tracks. By moving the transducing head radially across the surface of the disk, the transducing head can read information from or write information to different tracks of the magnetic disk.

The recording medium, i.e., magnetic disk, holds information encoded in the form of magnetic transitions. The information capacity, or areal density, of the medium is determined by the transducer's ability to sense and write distinguishable transitions. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics.

Spindle motors are commonly used to rotate magnetic disks at high speeds. Frequently, conventional spindle motors comprise small electric motors equipped with standard bail bearings. However, electric motors having ball bearings are known to experience problems such as runout or vibration that can prevent information from being accessed from disks rotated by the motors. This is especially true as advancements in data storage technology have increased magnetic disk storage densities.

The point is now being reached, however, where further advances are likely to be impeded by mechanical constraints. In particular, limitations will result from the spindle hub holding the stack of disks on account of the properties of the ball bearing assemblies used for rotational support. Random vibrations in both axial and radial axes ultimately lead to limitations in positioning accuracies and signal-to-noise ratios with consequences for storage capacities. The radial accuracy directly limits the number of concentric tracks on a disk on which data can be stored and reliably retrieved.

To overcome the problems associated with ball bearing electric motors, some disk drive systems now make use of electric motors having fluid hydrodynamic bearings. Bearings of this type are shown in U.S. Pat. Nos. 5,427,546 to Hensel, 5,516,212 to Titcomb and 5,707,154 to Ichiyama.

An exemplary hydrodynamic bearing typically includes a stationary shaft on which is mounted a rotary hub to which magnetic disks can be secured. There is no direct contact between the rotating hub and the shaft. Instead, a lubricating fluid such as air or oil forms a hydrodynamic bearing between the shaft and the rotary hub. Hydrodynamic pressure causes the lubricating fluid to act as a bearing between the shaft and the rotary hub. Frequently, capillary seals are used to retain the bearing fluid between the shaft and the rotary hub.

When used in association with spindle motors, air bearings provide numerous advantages. For example, air bearings are more efficient and consume less power than either ball bearings or oil bearings. Also, air bearings are quiet and have excellent run out characteristics.

Still, oil bearings have some disadvantages. For example, oil bearings consume more power than ball bearings or air bearings. Furthermore, when oil bearings are used in the journal bearing environment, oil leakage can be problematic.

In the future, spindle motor disk rotation speeds will steadily increase. As disk rotation speeds increase, the problems associated with standard oil bearings, air bearings and ball bearings will become magnified. Increased disk recording density is another trend in the industry. The combination of increased disk rotation speeds and increased recording densities will require disk drives to operate with improved run out characteristics. Thus, air bearings will be used more frequently as the rotating speed is increased because of the above-mentioned advantages.

However, to become more reliable, the problem with fluid leakage must be overcome. Presently, there is no known replenishment system that guarantees the oil will be returned at controllable rate.

It can be seen then that there is a need for a method and apparatus for replenishing oil in a fluid dynamic bearing using a sleeve groove.

SUMMARY OF THE INVENTION

To overcome the limitations in the prior art described above, and to overcome other limitations that will become apparent upon reading and understanding the present specification, the present invention discloses a method and apparatus for replenishing oil in a fluid dynamic bearing using a sleeve groove.

The present invention solves the above-described problems by providing a replenishing groove in the sleeve surrounding the shaft that centrifugal force forces the oil to move toward the radial bearings.

A sleeve in accordance with the principles of the present invention includes a cylindrical member having a bearing surface and at least one groove formed in the bearing surface of the cylindrical member extending from the center of the cylindrical member to at least one end of the cylindrical member, the groove defining a channel for directing the flow of oil to the at least one end of the cylindrical member.

Other embodiments of a sleeve in accordance with the principles of the invention may include alternative or optional additional aspects. One such aspect of the present invention is that the at least one groove comprises a plurality of grooves dispersed at predetermined positions along an inner circumference of the bearing surface.

Another aspect of the present invention is that the groove extends in the bearing surface from the center of the cylindrical member to a top and bottom of the cylindrical member.

Another aspect of the present invention is that the groove increases in depth as the groove extends toward at least one end of the cylindrical member.

Another aspect of the present invention is that the groove becomes wider as the groove extends toward at least one end of the cylindrical member.

In another embodiment of the present invention, a disk drive is provided. The disk drive includes at least one disk for recording and reading data thereon, a motor, coupled to the at least one disk, for rotating the at least one disk, at least one head disposed proximate the at least one disk for writing and reading data to and from the at least-one disk and an actuator arm assembly, coupled to the at least one head, for moving the at least one head relative to the at least one disk, wherein the motor further comprises a fluid dynamic bearing having a sleeve, the sleeve of the fluid dynamic bearing further including a cylindrical member having a bearing surface and at least one groove formed in the bearing surface of the cylindrical member extending from the center of the cylindrical member to at least one end of the cylindrical member, the groove defining a channel for directing the flow of oil to the at least one end of the cylindrical member.

In another embodiment of the present invention, a fluid dynamic bearing system is provided. The fluid dynamic bearing system includes a rotating shaft, an upper radial bearing for supporting the shaft at an upper end, a lower radial bearing for supporting the shaft at a lower end, a sleeve disposed around the upper and lower radial bearings and the shaft, the sleeve forming a chamber between the upper and lower radial bearings, wherein the chamber collects oil leaking from the upper radial bearing and the lower radial bearing and wherein the sleeve further includes a cylindrical member having a bearing surface and at least one groove formed in the bearing surface of the cylindrical member extending from the center of the cylindrical member to at least one end of the cylindrical member, the groove defining a channel for directing the flow of oil to the at least one end of the cylindrical member for replenishing at least one of the upper and lower radial bearings.

In another embodiment of the present invention, a method for replenishing oil to a fluid dynamic bearing is provided. The method includes forming a cylindrical member having a bearing surface, forming at least one groove in the bearing surface of the cylindrical member extending from the center of the cylindrical member to at least one end of the cylindrical member, and driving oil through the groove to the at least one end of the cylindrical member.

Another aspect of the present invention is that the forming at least one groove further comprises forming a plurality of grooves dispersed at predetermined positions along an inner circumference of the bearing surface.

Another aspect of the present invention is that the forming at least one groove further comprises forming a groove in the bearing surface extending from the center of the cylindrical member to a top and bottom of the cylindrical member.

Another aspect of the present invention is that the forming at least one groove further comprises forming a groove that increases in depth as the groove extends toward at least one end of the cylindrical member.

Another aspect of the present invention is that the forming at least one groove further comprises forming a groove that becomes wider as the groove extends toward at least one end of the cylindrical member.

These and various other advantages and features of novelty, which characterize the invention, are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a system for replenishing oil in a fluid dynamic bearing according to the present invention;

FIG. 4 illustrates a top view of the replenishing system according to the present invention showing at least one groove is formed on the inside bearing surface of the cylindrical member according to the present invention;

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for replenishing oil in a fluid dynamic bearing using a groove or channel formed in the sleeve. A replenishing groove is formed in the sleeve surrounding the shaft so that centrifugal force drives the oil to move toward the radial bearings.

Figure 1:
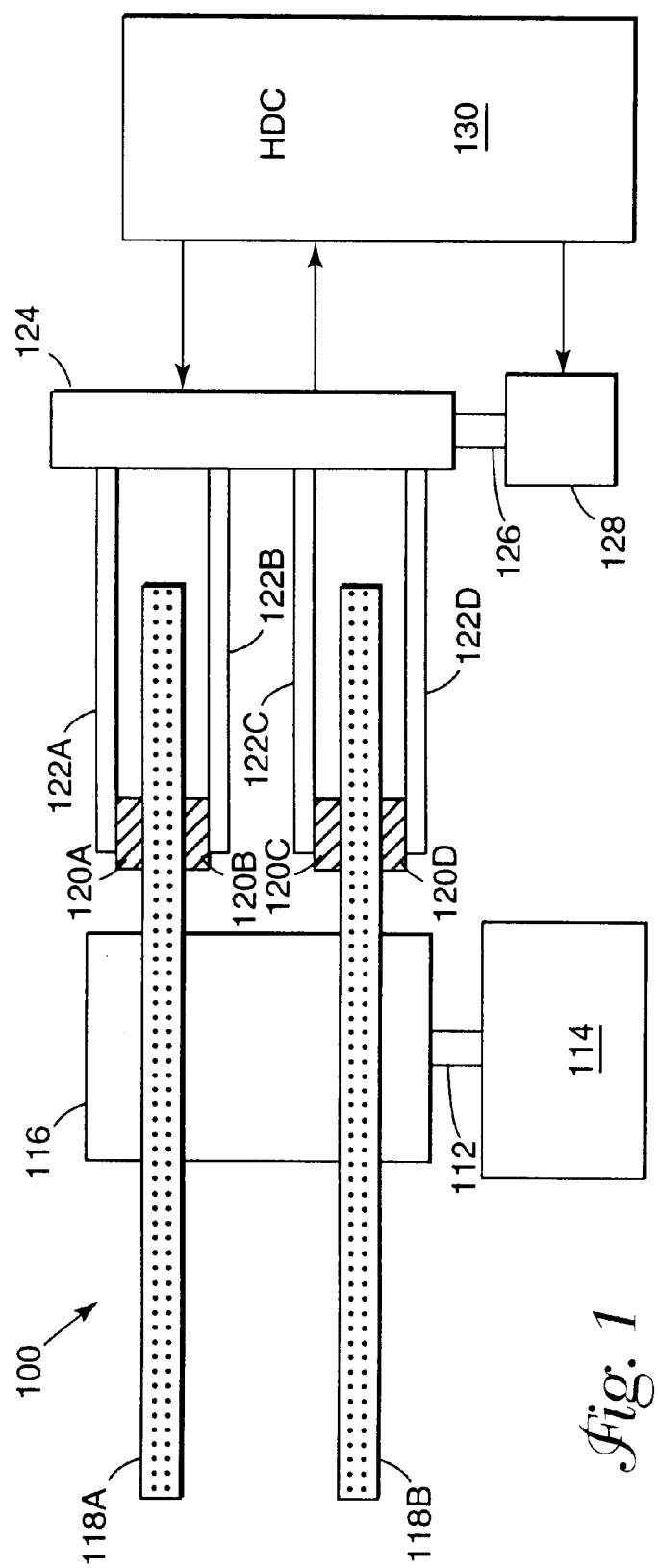
FIG. 1 illustrates a hard disk drive (HDD) including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that their axes are in coincidence. One or more information recording disks 118A and 118B are mounted to support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
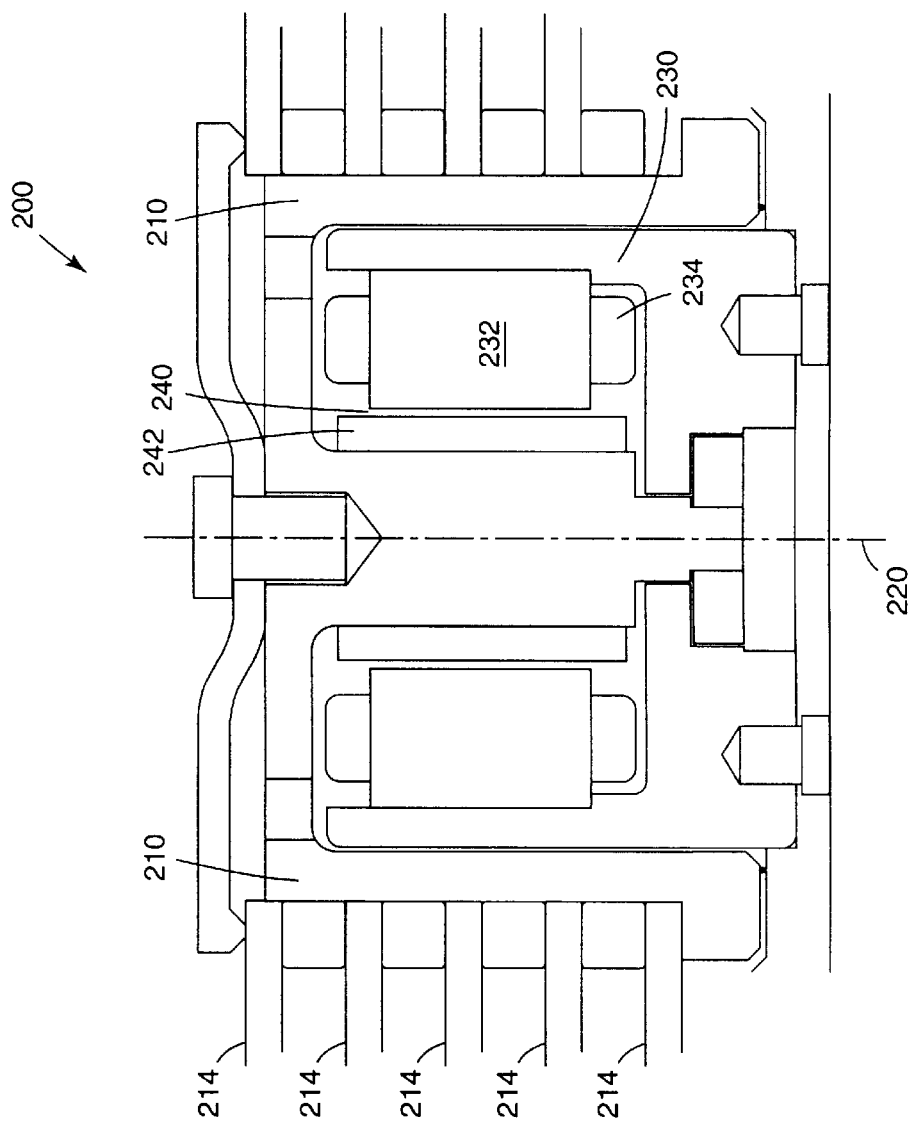
FIG. 2 illustrates a more detailed view of the motor according to the present invention.

FIG. 2 illustrates a more detailed view of the motor 200 according to the present invention. In FIG. 2, the motor 200 includes a rotatable hub 210 having a plurality of disk 214 mounted thereto. The hub 210 is mounted for rotation about an axis 220. A stator 230 is mounted inside the hub 210. The stator 230 includes a core 232 and armature windings 234. An air gap 240 is formed between the core 232 and the surface of magnetic poles 242. Typically, the armature windings are led out of the hub 210 and connected to a power supply of the disk drive via a motor control circuit (which may be hard disk controller 130 as shown in FIG. 1) for controlling the rotation of the hub 210 and associated disk 214.

FIG. 3 illustrates a system 300 for replenishing oil in a fluid dynamic bearing according to the present invention. The system 300 includes replenishing grooves or channels 308, 310 formed in a sleeve 312. In the fluid dynamic bearing illustrated in FIG. 3, the upper thrust bearing 320 is coupled with upper radial bearing 322. The lower thrust bearing 330 is coupled with lower radial bearing 332. The boundary between oil and air for the upper radial bearing 322 is located at 342 during running. The boundary between oil and air for the lower radial bearing 332 is located at 344. Oil at the upper radial bearing 322 has the tendency to leak oil to the chamber 350. The oil in the lower radial bearing 332 also has the tendency to leak oil to the chamber 350. Oil leaked to the chamber 350 will eventually be returned to the upper radial bearing 322 and lower radial bearing 332. However, traditional fluid dynamic bearings, there is no known replenishment system that guarantees the oil will be returned at controllable rate. The system 300 for replenishing oil in a fluid dynamic bearing according to the present invention would solve this return path problem.

FIG. 4 illustrates a top view 400 of the replenishing system according to the present invention. In FIG. 4, the sleeve 410 and shaft 416 are shown. The sleeve 410 is a cylindrical member 412 having a bearing surface 414. According to the present invention, at least one groove 420 is formed on the inside bearing surface 414 of the cylindrical member 412 according to the present invention. FIG. 4 shows that a plurality of grooves 420 are dispersed at predetermined positions along an inner circumference of the bearing surface 414.

Figure 5:
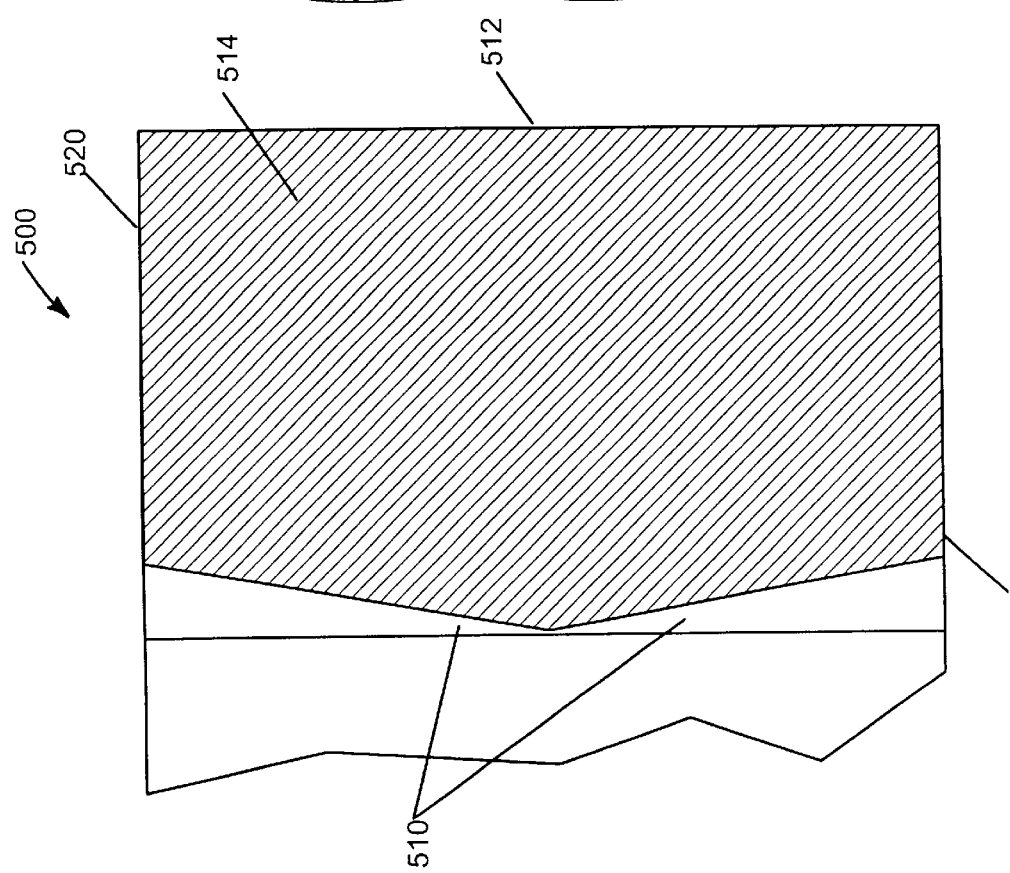
FIG. 5 illustrates a side view of the replenishing system according to the present invention showing the groove according to the present invention becoming deeper as the groove as the groove extends toward the top and bottom of the sleeve.

FIG. 5 illustrates a side view 500 of the replenishing system according to the present invention. In FIG. 5, a groove 510 extends substantially from the center 512 of the sleeve 514 to the top 520 and bottom 522 of the sleeve 514. The groove 510 in FIG. 5 is shown increasing in depth as the groove 510 extends toward the top 520 and bottom 522 of the sleeve 514. Those skilled in the art will recognize that the groove 510 may comprise an increasing depth as the groove 510 extends toward the top 520 and bottom 522 of the sleeve 514.

Figure 6:
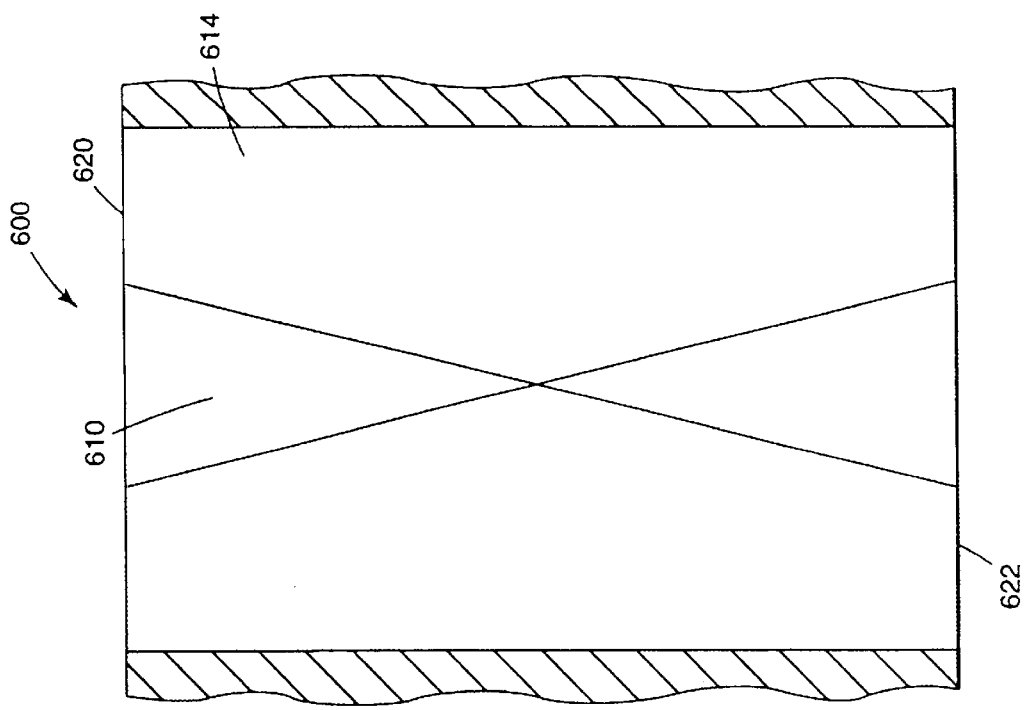
FIG. 6 illustrates that the groove according to the present invention becomes wider as the groove extends toward the top and bottom of the sleeve.

Alternatively, or in combination with a groove 510 that increases in depth as shown in FIG. 5, FIG. 6 illustrates that the groove 610 may become wider as the groove 610 extends toward the top 620 and bottom 622 of the sleeve 614.

Returning to FIG. 3, to return oil to the upper radial bearing 322, progressively deepening and/or widening replenishing grooves 308/310 are machined on the sleeve 312 in at lest one longitudinal direction in the chamber 350. The grooves 308/310 define a channel for directing the flow of oil to the at least one end of the sleeve 312. This groove 308 starts from near the center 360 of the chamber 350 extending to the interface between the upper radial bearing groove 322 and chamber 350.

Whereas return oil to the lower radial bearing 332, a progressively deepening replenishing groove 310 in the longitudinal direction in the chamber 350 is machined on the sleeve 312. This groove 310 starts from the center 360 of the chamber 350 and extends to the interface between the upper lower bearing groove 332 and chamber 350.

Thus, centrifugal force drives the oil toward the deeper end of progressively deepening grooves 308, 310 so that the oil leaking into the radial bearings 322 and 332 at interface 370 and interface 372.

In summary, therefore, the present invention provides a method and apparatus for replenishing oil in a fluid dynamic bearing using a sleeve groove. A replenishing groove is formed in the sleeve surrounding the shaft so that centrifugal force drives the oil to move toward the radial bearings.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A fluid dynamic bearing sleeve, comprising:
a cylindrical member having a bearing surface; and
at least one groove formed in the bearing surface of the cylindrical member extending from the center of the cylindrical member to at least one end of the cylindrical member, the groove defining a channel for directing the flow of oil to the at least one end of the cylindrical member, the groove increasing in depth as the groove extends toward at least one end of the cylindrical member.

2. The sleeve of claim 1 wherein the groove becomes wider as the groove extends toward at least one end of the cylindrical member.

3. A fluid dynamic bearing sleeve, comprising:
a cylindrical member having a bearing surface; and
at least one groove formed in the bearing surface of the cylindrical member extending from the center of the cylindrical member to at least one end of the cylindrical member, the groove defining a channel for directing the flow of oil to the at least one end of the cylindrical member, the groove becoming wider as the groove extends toward at least one end of the cylindrical member.

4. A disk drive, comprising:
at least one disk for recording and reading data thereon;
a motor, coupled to the at least one disk, for rotating the at least one disk;
at least one head disposed proximate the at least one disk for writing and reading data to and from the at least one disk; and
an actuator arm assembly, coupled to the at least one head, for moving the at least one head relative to the at least one disk;
wherein the motor further comprises a fluid dynamic bearing having a sleeve, the sleeve of the fluid dynamic bearing further comprising:
a cylindrical member having a bearing surface; and
at least one groove formed in the bearing surface of the cylindrical member extending from the center of the cylindrical member to at least one end of the cylindrical member, the groove difining a channel for directing the flow of oil to the at least one end of the cylindrical member, the groove increasing in depth as the groove extends toward at least one end of the cylindrical member.

5. The disk drive of claim 4 wherein the groove becomes wider as the groove extends toward at least one end of the cylindrical member.

6. A disk drive, comprising:
at least one disk for recording and reading data thereon;
a motor, coupled to the at least one disk, for rotating the at least one disk;
at least one head disposed proximate the at least one disk for writing and reading data to and from the at least one disk; and
an actuator arm assembly, coupled to the at least one head, for moving the at least one head relative to the at least one disk;
wherein the motor further comprises a fluid dynamic bearing having a sleeve, the sleeve of the fluid dynamic bearing further comprising:
a cylindrical member having a bearing surface; and
at least one groove formed in the bearing surface of the cylindrical member extending from the center of the cylindrical member to at least one end of the cylindrical member, the groove defining a channel for directing the flow of oil to the at least one end of the cylindrical member, the groove becoming wider as the groove extends toward at least one end of the cylindrical member.

7. A fluid dynamic bearing system, comprising:
a rotating shaft;
an upper radial bearing for supporting the shaft at an upper end;
a lower radial bearing for supporting the shaft at a lower end;
a sleeve disposed around the upper and lower radial bearings and the shaft, the sleeve forming a chamber between the upper and lower radial bearings, wherein the chamber collects oil leaking from the upper radial bearing and the lower radial bearing and wherein the sleeve further comprises:
a cylindrical member having a bearing surface; and
at least one groove formed in the bearing surface of the cylindrical member extending from the center of the cylindrical member to at least one end of the cylindrical member, the groove defining a channel for directing the flow of oil to the at least one end of the cylindrical member for replenishing at least one of the upper and lower radial bearings, the groove increasing in depth as the groove extends toward at least one end of the cylindrical member.

8. The fluid dynamic bearing system of claim 7 wherein the groove becomes wider as the groove extends toward at least one end of the cylindrical member.

9. A fluid dynamic bearing system, comprising:
a rotating shaft;
an upper radial bearing for supporting the shaft at an upper end;
a lower radial bearing for supporting the shaft at a lower end;
a sleeve disposed around the upper and lower radial bearings and the shaft, the sleeve forming a chamber between the upper and lower radial bearings, wherein the chamber collects oil leaking from the upper radial bearing and the lower radial bearing and wherein the sleeve further comprises:
a cylindrical member having a bearing surface; and
at least one groove formed in the bearing surface of the cylindrical member extending from the center of the cylindrical member to at least one end of the cylindrical member, the groove defining a channel for directing the flow of oil to the at least one end of the cylindrical member for replenishing at least one of the upper and lower radial bearings, the groove becoming wider as the groove extends toward at least one end of the cylindrical member.

10. A method for replenishing oil to a fluid dynamic bearing, comprising:
forming a cylindrical member having a bearing surface;
forming at least one groove in the bearing surface of the cylindrical member extending from the center of the cylindrical member to at least one end of the cylindrical member, the groove increasing in depth as the groove extends toward at least one end of the cylindrical member; and
driving oil through the groove to the at least one end of the cylindrical member.

11. The method of claim 10 wherein the forming at least one groove further comprises forming a groove that becomes wider as the groove extends toward at least one end of the cylindrical member.

12. A method for replenishing oil to a fluid dynamic bearing, comprising:
forming a cylindrical member having a bearing surface;
forming at least one groove in the bearing surface of the cylindrical member extending from the center of the cylindrical member to at least one end of the cylindrical member, the groove becoming wider as the groove extends toward at least one end of the cylindrical member; and
driving oil through the groove to the at least one end of the cylindrical member.

13. A fluid dynamic bearing system, comprising:
a shaft; and
a sleeve disposed around the shaft, the sleeve comprising:
a cylindrical member having a bearing surface;
a first end and a second end, both first and second ends distal from a center of the sleeve; and
at least one first groove and at least one second groove on the cylindrical member, wherein during rotation the at least one first groove forces fluid away from the center to the first end and the at least one second groove forces fluid away from the center to the second end, and wherein the at least one first and second grooves increase in depth as the at least one first and second grooves extend toward the first and second ends of the sleeve.

14. The fluid dynamic bearing system of claim 13, wherein the at least one first and second grooves become wider as the at least one first and second grooves extend toward the first and second ends of the sleeve.

15. A fluid dynamic bearing system, comprising:
a shaft; and
a sleeve disposed around the shaft, the sleeve comprising:
a cylindrical member having a bearing surface;
a first end and a second end, both first and second ends distal from a center of the sleeve; and
at least one first groove and at least one second groove on the cylindrical member, wherein during rotation the at least one first groove forces fluid away from the center to the first end and the at least one second groove forces fluid away from the center to the second end, and wherein the at least one first and second grooves become wider as the at least one first and second grooves extend toward the first and second ends of the sleeve.

* * * * *